No. 849,376. PATENTED APR. 9, 1907.
W. W. DIVINEY.
NUT LOCK.
APPLICATION FILED FEB. 5, 1906.
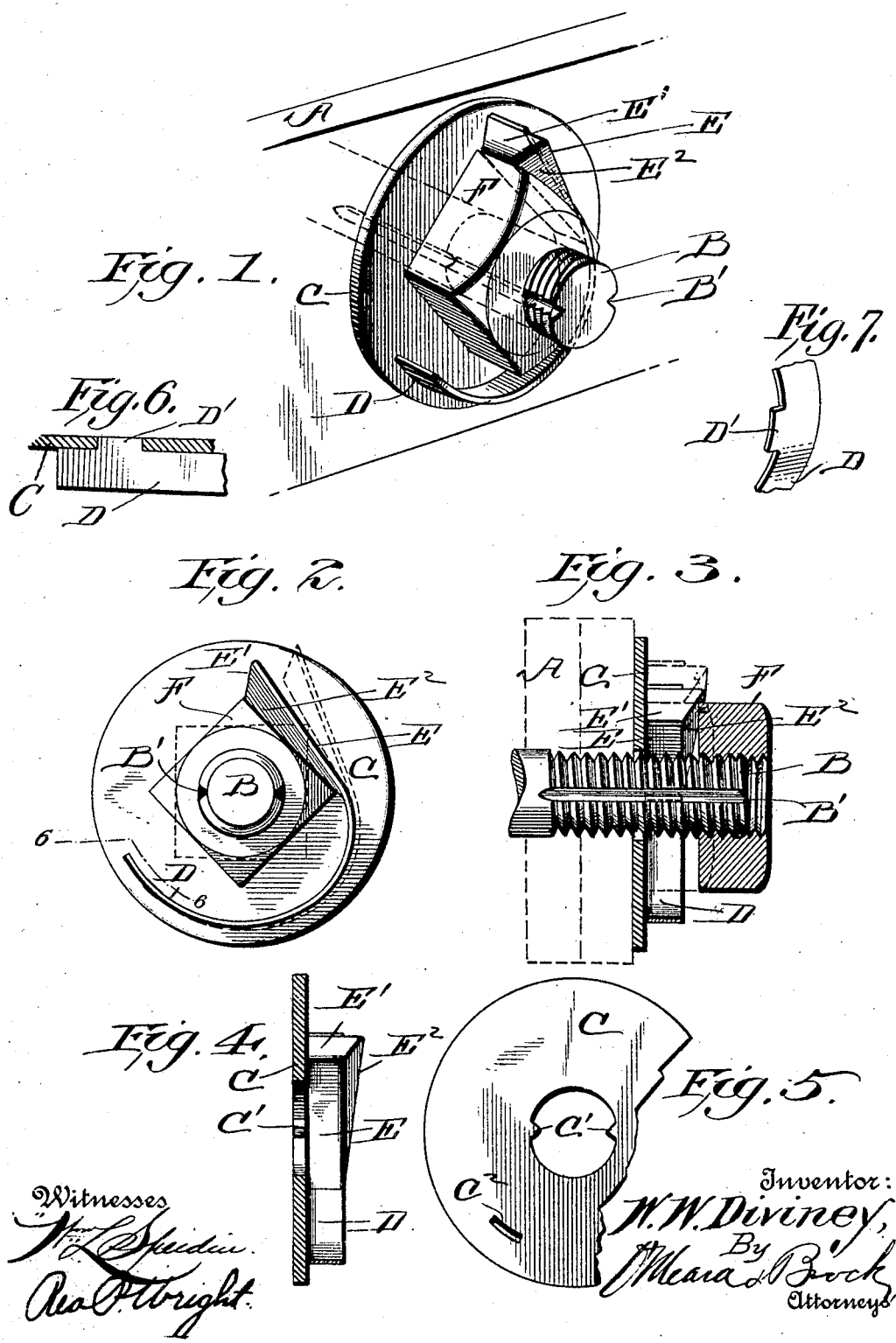
Witnesses
Inventor:
W. W. Diviney,
By
Attorneys

UNITED STATES PATENT OFFICE.

WILLIAM W. DIVINEY, OF ALLPORT, PENNSYLVANIA.

NUT-LOCK.

No. 849,376.    Specification of Letters Patent.    Patented April 9, 1907.

Application filed February 5, 1906. Serial No. 299,577.

*To all whom it may concern:*

Be it known that I, WILLIAM W. DIVINEY, a citizen of the United States, residing at Allport, in the county of Clearfield and State of Pennsylvania, have invented a new and useful Improvement in a Nut-Lock, of which the following is a specification.

My invention is a new and useful improvement in a nut-lock, and has for its object to provide a nut-lock which is very simple and cheap in construction and one that is very effective in use.

Another object of my invention is to provide a locking device in connection with the washer which will securely lock the nut in place and at the same time allow the nut to be turned off or on when desired.

With these objects in view the invention consists of the novel features of construction, combination, and arrangement of parts hereinafter fully described, and pointed out in the claims.

In the drawings forming a part of this specification, Figure 1 is a perspective view of the device, showing it attached. Fig. 2 is a top plan view. Fig. 3 is a sectional view of the device attached. Fig. 4 is a sectional view of the device detached. Fig. 5 is a plan view of the washer, partly broken away. Fig. 6 is a detail sectional view of the washer, showing the manner of securing the spring thereon. Fig. 7 is a perspective view of a portion of the spring.

Referring to the drawings, A indicates an ordinary fish-plate of a rail-joint, on which my device is especially adapted to be used; but it will of course be understood that the device can be used where a bolt and nut is used with the same results.

The threaded portion of the bolt B is provided with longitudinal oppositely-arranged grooves B', in which the oppositely-arranged inwardly-projecting lugs C' of the washer C are adapted to fit and prevent the washer from turning with the nut.

The washer C is provided with a curved slot C², in which is secured the downwardly-projecting lug formed adjacent one end of the bowed spring D, which securely holds the spring thereon.

The free end of the bowed spring D carries a wedge-shaped block E, having a beveled end E' and a beveled upper edge E², so that the bottom of the nut F will strike the beveled edges and spread the spring D when the nut is first started to be screwed thereon. The flat side of the block E is adapted to engage one side of the nut F and prevent the nut from turning.

From the foregoing description it will be seen that I have provided a nut-lock which is so constructed that the nut can be easily and quickly screwed on and off the bolt with the use of a wrench.

Having thus fully described my invention, what I claim as new, and desire to secure by Letters Patent, is—

1. In a nut-lock, the combination with a bolt provided with longitudinal grooves, of a washer provided with inwardly-projecting lugs adapted to fit on the said bolt and in said grooves and a slot adjacent its edge, and a bowed spring having a lug adapted to fit in said slot arranged on the face of the washer, provided with a locking-block adapted to engage the nut when screwed on the bolt, for the purpose described.

2. In a nut-lock, the combination with a bolt provided with longitudinal grooves, of a washer provided with lugs adapted to fit in said grooves, a slot formed in said washer, a bowed spring provided with a downwardly-projecting lug adjacent one end secured in said slot one edge of the spring resting on the face of the washer, and a locking-block secured to the free end of the spring adapted to engage the nut when screwed on the bolt, for the purpose described.

3. In a nut-lock, the combination with a bolt and nut, the bolt being provided with longitudinal grooves, of a washer provided with inwardly-projecting pointed lugs adapted to fit in said grooves, a slot formed in said washer, a bowed spring provided with a lug adapted to be secured in said slot one edge of the spring resting on the face of the washer, and a wedge-shaped block provided with a beveled end and upper edge secured to the free end of the spring adapted to engage the nut, for the purpose described.

4. In a nut-lock, the combination with a longitudinally-grooved bolt, of a washer provided with pointed lugs adapted to fit in said grooves, having a slot formed therein adjacent its outer edge, and a bowed spring provided with a downwardly-projecting lug, adjacent one end secured in said slot on the face of said washer and provided with a locking-block at its free end adapted to engage the nut when screwed on the bolt, for the purpose described.

WILLIAM W. DIVINEY.

Witnesses:
 JOHN PETTERSON,
 H. A. GRAHAM.